(12) United States Patent
Wada

(10) Patent No.: US 9,666,370 B2
(45) Date of Patent: May 30, 2017

(54) MULTILAYER CERAMIC CAPACITOR AND METHOD FOR PRODUCING THE SAME

(71) Applicant: Murata Manufacturing Co., Ltd., Nagaokakyo-shi, Kyoto-fu (JP)

(72) Inventor: Nobuyuki Wada, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 0 days.

(21) Appl. No.: 14/980,370

(22) Filed: Dec. 28, 2015

(65) Prior Publication Data

US 2016/0118188 A1  Apr. 28, 2016

Related U.S. Application Data

(63) Continuation of application No. PCT/JP2014/053241, filed on Feb. 13, 2014.

(30) Foreign Application Priority Data

Sep. 18, 2013 (JP) ................. 2013-192490

(51) Int. Cl.
*H01G 4/12* (2006.01)
*C04B 35/468* (2006.01)
(Continued)

(52) U.S. Cl.
CPC .......... *H01G 4/1227* (2013.01); *B32B 18/00* (2013.01); *C01G 23/006* (2013.01);
(Continued)

(58) Field of Classification Search
CPC .......................... C04B 35/4682; H01G 4/1227
See application file for complete search history.

(56) References Cited

U.S. PATENT DOCUMENTS 7,381,464 B2* 6/2008 Ito ............... C04B 35/62645
428/402
7,498,082 B2* 3/2009 Ito ............... H01G 4/1209
419/19
(Continued)

FOREIGN PATENT DOCUMENTS

CN 1715239 A 1/2006
JP 2006-008498 A 1/2006
(Continued)

OTHER PUBLICATIONS

International Search Report issued for PCT/JP2014/053241, date of mailing Apr. 28, 2014.
(Continued)

*Primary Examiner* — Karl Group
(74) *Attorney, Agent, or Firm* — Arent Fox LLP

(57) ABSTRACT

A dielectric ceramic that forms dielectric ceramic layers of a multilayer ceramic capacitor contains a Ba and Ti containing perovskite compound, Ca, R (R denotes a rare earth element, such as La), M (M denotes Mn or the like), and Si. The Ca content ranges from 0.5 to 2.5 molar parts, the R content ranges from 0.5 to 4 molar parts, the M content ranges from 0.5 to 2 molar parts, and the Si content ranges from 1 to 4 molar parts, based on 100 molar parts of Ti. In perovskite crystal grains, the Ca diffusion depth is 10% or less of the average grain size of the crystal grains, and the Ca concentration in a Ca diffusion region is 0.2 to 5 molar parts higher than the Ca concentration near the center of each of the crystal grains.

20 Claims, 2 Drawing Sheets

(51) Int. Cl.
*H01G 4/30* (2006.01)
*B32B 18/00* (2006.01)
*C01G 23/00* (2006.01)
*C04B 35/626* (2006.01)
*C04B 35/634* (2006.01)
*C04B 35/638* (2006.01)
*H01G 4/012* (2006.01)

(52) U.S. Cl.
CPC .... *C04B 35/4682* (2013.01); *C04B 35/62675* (2013.01); *C04B 35/62685* (2013.01); *C04B 35/634* (2013.01); *C04B 35/638* (2013.01); *H01G 4/012* (2013.01); *H01G 4/1209* (2013.01); *H01G 4/30* (2013.01); *C01P 2002/34* (2013.01); *C01P 2004/04* (2013.01); *C01P 2006/40* (2013.01); *C04B 2235/3206* (2013.01); *C04B 2235/3208* (2013.01); *C04B 2235/3215* (2013.01); *C04B 2235/3217* (2013.01); *C04B 2235/3224* (2013.01); *C04B 2235/3225* (2013.01); *C04B 2235/3227* (2013.01); *C04B 2235/3232* (2013.01); *C04B 2235/3239* (2013.01); *C04B 2235/3241* (2013.01); *C04B 2235/3256* (2013.01); *C04B 2235/3258* (2013.01); *C04B 2235/3262* (2013.01); *C04B 2235/3275* (2013.01); *C04B 2235/3281* (2013.01); *C04B 2235/3418* (2013.01); *C04B 2235/442* (2013.01); *C04B 2235/5445* (2013.01); *C04B 2235/602* (2013.01); *C04B 2235/6562* (2013.01); *C04B 2235/6582* (2013.01); *C04B 2235/6584* (2013.01); *C04B 2235/85* (2013.01); *C04B 2237/346* (2013.01); *C04B 2237/68* (2013.01)

(56) References Cited

U.S. PATENT DOCUMENTS

| | | | |
|---|---|---|---|
| 8,830,651 B2* | 9/2014 | Yamaguchi | H01B 3/12 361/301.2 |
| 2005/0260410 A1 | 11/2005 | Fujikawa et al. | |
| 2006/0116273 A1* | 6/2006 | Ito | C04B 35/62645 501/137 |
| 2007/0149382 A1 | 6/2007 | Ito et al. | |
| 2008/0220964 A1* | 9/2008 | Fujikawa | C04B 35/4682 501/137 |
| 2010/0067171 A1 | 3/2010 | Yamazaki et al. | |
| 2014/0009868 A1* | 1/2014 | Yamaguchi | C04B 35/4682 361/321.4 |
| 2014/0078642 A1* | 3/2014 | Shinichi | H01B 3/12 361/301.4 |
| 2016/0104576 A1* | 4/2016 | Park | H01G 4/1227 361/301.4 |

FOREIGN PATENT DOCUMENTS

| | | |
|---|---|---|
| JP | 2007-131476 A | 5/2007 |
| JP | 4407497 B2 | 2/2010 |
| JP | 2011-176184 A | 9/2011 |
| JP | 2011-184251 A | 9/2011 |
| JP | 4814342 B2 | 11/2011 |
| WO | WO 2013027500 A1 | 2/2013 |

OTHER PUBLICATIONS

Written Opinion of the International Searching Authority issued for PCT/JP2014/053241, date of mailing Apr. 28, 2014.

* cited by examiner

MULTILAYER CERAMIC CAPACITOR AND METHOD FOR PRODUCING THE SAME

CROSS REFERENCE TO RELATED APPLICATIONS

The present application is a continuation of International application No. PCT/JP2014/053241, filed Feb. 13, 2014, which claims priority to Japanese Patent Application No. 2013-192490, filed Sep. 18, 2013, the entire contents of each of which are incorporated herein by reference.

FIELD OF THE INVENTION

The present invention relates to a multilayer ceramic capacitor and a method for producing the multilayer ceramic capacitor and more particularly to an improvement in the crystal grain morphology of a dielectric ceramic advantageous to a decrease in the size and an increase in the capacitance of a multilayer ceramic capacitor.

BACKGROUND OF THE INVENTION

With recent advances in electronics technology, there have been demands for a decrease in the size and an increase in the capacitance of multilayer ceramic capacitors. To meet these demands, the thicknesses of dielectric ceramic layers of multilayer ceramic capacitors are decreased. However, a decrease in the thickness of dielectric ceramic layers results in a relative increase in the intensity of the electric field applied to the dielectric ceramic layers. Thus, dielectric ceramics that form dielectric ceramic layers need to have reliability in the presence of voltage, particularly improved lifetime characteristics in high-temperature loading tests.

For example, Japanese Patent No. 4407497 (Patent Document 1) discloses the following dielectric ceramic composition as a technique interesting for the present invention.

The dielectric ceramic composition contains a main component containing barium titanate, a first auxiliary component containing at least one selected from MgO, CaO, BaO, and SrO, a second auxiliary component containing silicon oxide as a main component, a third auxiliary component containing at least one selected from $V_2O_5$, $MoO_3$, and $WO_3$, a fourth auxiliary component containing an oxide of R1 (R1 denotes at least one selected from Sc, Er, Tm, Yb, and Lu), a fifth auxiliary component containing $CaZrO_3$ or $CaO+ZrO_2$, a sixth auxiliary component containing an oxide of R2 (R2 denotes at least one selected from Y, Dy, Ho, Tb, Gd, and Eu), and a seventh auxiliary component containing MnO. The ratio of each of the auxiliary components to 100 moles of the main component is as follows: the first auxiliary component: 0.1 to 3 moles, the second auxiliary component: 2 to 10 moles, the third auxiliary component: 0.01 to 0.5 moles, the fourth auxiliary component: 0.5 to 7 moles (the number of moles of the fourth auxiliary component represents the ratio for R1 alone), the fifth auxiliary component: 0<fifth auxiliary component 5 moles, the sixth auxiliary component: 9 moles or less (the number of moles of the sixth auxiliary component represents the ratio for R2 alone), and the seventh auxiliary component: 0.5 moles or less. The dielectric ceramic composition further contains a plurality of crystal grains, wherein the crystal grains have a Ca diffusion region in which at least the Ca diffuses from the surface to the interior of the crystal grains, and the average depth T of the Ca diffusion region in the crystal grains having an average grain size D50 is controlled in the range of 10% to 30% of the D50.

Although the ceramic composition has improved IR temperature dependency, the dielectric constant-temperature characteristics deteriorate with decreasing thickness of dielectric ceramic layers of a multilayer ceramic capacitor formed of the ceramic composition.

Japanese Unexamined Patent Application Publication No. 2007-131476 (Patent Document 2) discloses a dielectric ceramic composition containing dielectric particles having a main component phase composed mainly of barium titanate and a diffusion phase around the main component phase, wherein variations in the average diffusion depth of the dielectric particles have CV in the range of 5% to 30%, and the average diffusion depth refers to the average depth at which an auxiliary component element in the diffusion phase diffuses from the surface of the diffusion phase toward the center of each of the dielectric particles.

In Patent Document 2, one of the auxiliary component elements is Ca, and the thickness of the diffusion phase in which an auxiliary component element diffuses varies in a predetermined range. Thus, it is argued that the dielectric ceramic composition has balanced characteristics in terms of the relative dielectric constant, high-temperature accelerated lifetime, Tc bias, and IR temperature dependency. However, the reliability of multilayer ceramic capacitors produced from the dielectric ceramic composition decreases with decreasing thickness of dielectric ceramic layers of the multilayer ceramic capacitors.

Patent Document 1: Japanese Patent No. 4407497
Patent Document 2: Japanese Unexamined Patent Application Publication No. 2007-131476

SUMMARY OF THE INVENTION

In the dielectric ceramic compositions disclosed in Patent Documents 1 and 2, a region in which Ca diffuses from the dielectric ceramic grain boundary into crystal grains is controlled so as to improve the electrical characteristics of the dielectric ceramics. As described above, however, the dielectric constant-temperature characteristics and reliability deteriorate with decreasing thickness of dielectric ceramic layers.

Accordingly, it is an object of the present invention to provide a multilayer ceramic capacitor and a method for producing the multilayer ceramic capacitor that can solve the problems as described above.

The present invention is directed to a multilayer ceramic capacitor and also to a method for producing the multilayer ceramic capacitor.

1. Multilayer Ceramic Capacitor

The present invention is first directed to a multilayer ceramic capacitor that includes a multilayer body including a plurality of stacked dielectric ceramic layers and a plurality of internal electrodes disposed along a plurality of interfaces between the dielectric ceramic layers, the dielectric ceramic layers being formed of a dielectric ceramic containing crystal grains and crystal grain boundaries, and an outer electrode disposed on a surface of the multilayer body and electrically connected to specific internal electrodes thereamong.

The present invention has a first aspect in which a perovskite compound contained in the dielectric ceramic contains Ba and Ti and a second aspect in which the perovskite compound contains Ba, Ca, and Ti. In each of the first and second aspects, the composition of the dielectric ceramic is specified by three methods in order to easily clarify the technical scope of the present invention.

[First Aspect]

In the first aspect, the multilayer body or the dielectric ceramic layers contain a perovskite compound containing Ba and Ti, and Ca, R (R denotes at least one of La, Ce, Pr, Nd, Sm, Eu, Gd, Tb, Dy, Ho, and Y), M (M denotes at least one of Mn, Co, Fe, Cr, Cu, Mg, Al, V, Mo, and W), and Si.

In the first aspect, the composition of the dielectric ceramic is specified by the following first to third methods.

(First Specification Method/First Aspect)

The multilayer body contains, with respect to 100 molar parts of Ti, 0.5 molar parts to 2.5 molar parts of Ca, 0.5 molar parts to 4 molar parts of R, 0.5 molar parts to 2 molar parts of M, and 1 molar parts to 4 molar parts of Si.

(Second Specification Method/First Aspect)

A solution of the multilayer body contains, with respect to 100 molar parts of Ti, 0.5 molar parts to 2.5 molar parts of Ca, 0.5 molar parts to 4 molar parts of R, 0.5 molar parts to 2 molar parts of M, and 1 molar parts to 4 molar parts of Si.

(Third Specification Method/First Aspect)

The dielectric ceramic layers contain, with respect to 100 molar parts of Ti, 0.5 molar parts to 2.5 molar parts of Ca, 0.5 molar parts to 4 molar parts of R, 0.5 molar parts to 2 molar parts of M, and 1 molar parts to 4 molar parts of Si.

[Second Aspect]

In the second aspect, the multilayer body or the dielectric ceramic layers contain a perovskite compound containing Ba, Ca, and Ti, and Ca, R (R denotes at least one of La, Ce, Pr, Nd, Sm, Eu, Gd, Tb, Dy, Ho, and Y), M (M denotes at least one of Mn, Co, Fe, Cr, Cu, Mg, Al, V, Mo, and W), and Si.

Also in the second aspect, the composition of the dielectric ceramic is specified by the following first to third methods.

(First Specification Method/Second Aspect)

The multilayer body contains, with respect to 100 molar parts of Ti, 2.5 molar parts to 15 molar parts of Ca, 0.5 molar parts to 4 molar parts of R, 0.5 molar parts to 2 molar parts of M, and 1 molar parts to 4 molar parts of Si.

(Second Specification Method/Second Aspect)

A solution of the multilayer body contains, with respect to 100 molar parts of Ti, 2.5 molar parts to 15 molar parts of Ca, 0.5 molar parts to 4 molar parts of R, 0.5 molar parts to 2 molar parts of M, and 1 molar parts to 4 molar parts of Si.

(Third Specification Method/Second Aspect)

The dielectric ceramic layers contain, with respect to 100 molar parts of Ti, 2.5 molar parts to 15 molar parts of Ca, 0.5 molar parts to 4 molar parts of R, 0.5 molar parts to 2 molar parts of M, and 1 molar parts to 4 molar parts of Si.

In addition to these constituents, the present invention includes the following characteristic constituents.

The crystal grains include perovskite crystal grains composed mainly of the perovskite compound.

When the Ca concentration in the perovskite crystal grains is represented by a relative Ca concentration with respect to 100 molar parts of Ti at a point of measurement, the crystal grains have a "Ca diffusion depth" which is in a range of 10% or less of the average grain size of the crystal grains, the "Ca diffusion depth" being defined as the distance of a region that has the Ca concentration higher by 0.1 molar parts or greater with respect to the Ca concentration measured near the center of the crystal grain, the distance being measured from the crystal grain boundary toward the center of the crystal grain, and the "increased Ca concentration" ranges from 0.2 molar parts to 5 molar parts, when the "increased Ca concentration" is defined as the difference between the average Ca concentration at the region of the "Ca diffusion depth" and the Ca concentration measured near the center of the crystal grain.

In a multilayer ceramic capacitor according to the present invention, a rare earth element R, as well as Ca, is preferably diffused in the region defining the "Ca diffusion depth". Such a constituent can further improve reliability.

The present invention is advantageously applied to multilayer ceramic capacitors that include dielectric ceramic layers each having a decreased thickness of 0.8 μm or less on average.

2. Method for Producing Multilayer Ceramic Capacitor

The present invention is also directed to a method for producing a multilayer ceramic capacitor. This production method also has a first aspect in which a perovskite compound contained in the dielectric ceramic contains Ba and Ti and a second aspect in which the perovskite compound contains Ba, Ca, and Ti.

[First Aspect]

In the first aspect, a method for producing a multilayer ceramic capacitor includes preparing a ceramic slurry containing a main component powder, a Ca compound, an R (R denotes at least one of La, Ce, Pr, Nd, Sm, Eu, Gd, Tb, Dy, Ho, and Y) compound, an M (M denotes at least one of Mn, Co, Fe, Cr, Cu, Mg, Al, V, Mo, and W) compound, and a Si compound, the main component powder being composed mainly of a perovskite compound containing Ba and Ti; forming a ceramic green sheet from the ceramic slurry; forming an internal electrode on the ceramic green sheet; stacking a plurality of the ceramic green sheets including the ceramic green sheet on which the internal electrode is formed, thereby forming a green multilayer body; firing the green multilayer body to form a multilayer body including a plurality of dielectric ceramic layers and a plurality of internal electrodes disposed along a plurality of interfaces between the dielectric ceramic layers, the dielectric ceramic layers being formed of a dielectric ceramic containing crystal grains and crystal grain boundaries; and forming an outer electrode on a surface of the multilayer body such that the outer electrode is electrically connected to specific internal electrodes thereamong.

The ceramic slurry contains, with respect to 100 molar parts of Ti, 0.5 molar parts to 2.5 molar parts of Ca, 0.5 molar parts to 4 molar parts of R, 0.5 molar parts to 2 molar parts of M, and 1 molar parts to 4 molar parts of Si.

The crystal grains include perovskite crystal grains composed mainly of the perovskite compound.

When the concentration of Ca in the perovskite crystal grains is represented by the relative concentration of Ca with respect to 100 molar parts of Ti at a point of measurement, the crystal grains have a "Ca diffusion depth" which is in a range of 10% or less of the average grain size of the crystal grains, the "Ca diffusion depth" being defined as the distance of a region that has the Ca concentration higher by 0.1 molar parts or greater with respect to the Ca concentration measured near the center of the crystal grain, the distance being measured from the crystal grain boundary toward the center of the crystal grain, and the "increased Ca concentration" ranges from 0.2 molar parts to 5 molar parts, when the "increased Ca concentration" is defined as the difference between the average Ca concentration at the region of the "Ca diffusion depth" and the Ca concentration measured near the center of the crystal grain.

[Second Aspect]

In the second aspect, a method for producing a multilayer ceramic capacitor includes preparing a ceramic slurry containing a main component powder, a Ca compound, an R (R denotes at least one of La, Ce, Pr, Nd, Sm, Eu, Gd, Tb, Dy, Ho, and Y) compound, an M (M denotes at least one of Mn, Co, Fe, Cr, Cu, Mg, Al, V, Mo, and W) compound, and a Si compound, the main component powder being composed mainly of a perovskite compound containing Ba, Ca, and Ti; forming a ceramic green sheet from the ceramic slurry; forming an internal electrode on the ceramic green sheet; stacking a plurality of the ceramic green sheets including the ceramic green sheet on which the internal electrode is formed, thereby forming a green multilayer body; firing the green multilayer body to form a multilayer body including a plurality of dielectric ceramic layers and a plurality of internal electrodes disposed along a plurality of interfaces between the dielectric ceramic layers, the dielectric ceramic layers being formed of a dielectric ceramic containing crystal grains and crystal grain boundaries; and forming an outer electrode on a surface of the multilayer body such that the outer electrode is electrically connected to specific internal electrodes thereamong.

The ceramic slurry contains, with respect to 100 molar parts of Ti, 2.5 molar parts to 15 molar parts of Ca, 0.5 molar parts to 4 molar parts of R, 0.5 molar parts to 2 molar parts of M, and 1 molar parts to 4 molar parts of Si.

The crystal grains include perovskite crystal grains composed mainly of the perovskite compound.

When the concentration of Ca in the perovskite crystal grains is represented by the relative concentration of Ca with respect to 100 molar parts of Ti at a point of measurement, the crystal grains have a "Ca diffusion depth" corresponding to 10% or less of the average grain size of the crystal grains, the "Ca diffusion depth" being the distance of a region that has a Ca concentration 0.1 molar parts or more higher than the Ca concentration measured near the center of each of the crystal grains, the distance being measured from a crystal grain boundary toward the center of each of the crystal grains, and the "increased Ca concentration" ranges from 0.2 to 5 molar parts, the "increased Ca concentration" being the difference between the average concentration of Ca in the region defining the "Ca diffusion depth" and the Ca concentration measured near the center of each of the crystal grains.

In the present invention, the "Ca diffusion depth" is 10% or less of the average grain size of the perovskite crystal grains ($ABO_3$ crystal grains). Thus, in the $ABO_3$ crystal grains, there is a large region having the $ABO_3$ composition in which substantially no auxiliary component Ca is diffused. This allows the dielectric ceramic that forms the dielectric ceramic layers to maintain a high relative dielectric constant and can suppress the decrease in relative dielectric constant due to the increased intensity of the electric field, even when the thickness of the dielectric ceramic layers is decreased and thereby a high electric field is applied to the dielectric ceramic layers.

A high concentration of Ca in the region defining the "Ca diffusion depth" such as an "increased Ca concentration" in the range of 0.2 to 5 molar parts results in dielectric ceramics having high reliability at high temperatures.

Thus, the present invention can achieve satisfactory electrical characteristics and high reliability and provide a small, stable, high-quality multilayer ceramic capacitor having large capacitance and satisfactory lifetime characteristics.

DETAILED DESCRIPTION OF THE PREFERRED EMBODIMENTS

Figure 1:
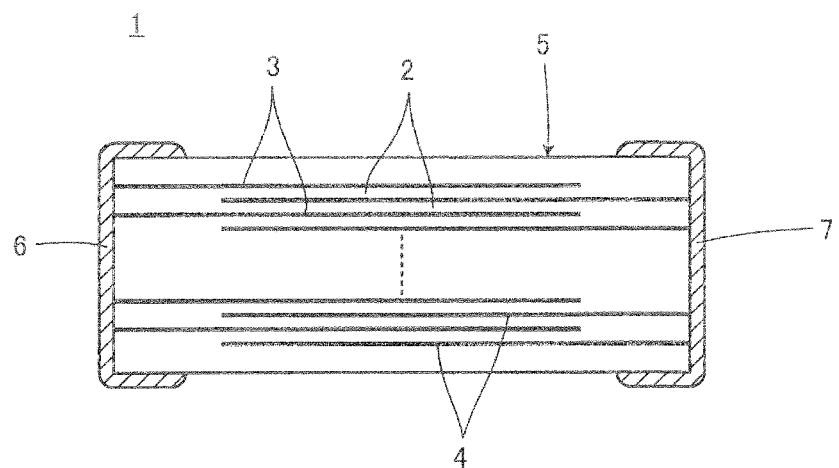
FIG. 1 is a schematic cross-sectional view of a multilayer ceramic capacitor 1 according to an embodiment of the present invention.

First, the structure of a multilayer ceramic capacitor 1 according to an embodiment of the present invention will be described below with reference to FIG. 1.

The multilayer ceramic capacitor 1 includes a multilayer body 5, which includes a plurality of stacked dielectric ceramic layers 2 and a plurality of internal electrodes 3 and 4 disposed along a plurality of interfaces between the dielectric ceramic layers 2. The internal electrodes 3 and 4 are composed mainly of Ni, for example.

First and second outer electrodes 6 and 7 are disposed at different positions on the outer surface of the multilayer body 5. The outer electrodes 6 and 7 are composed mainly of Ag or Cu, for example. Although not shown in the figure, a plating film is formed on the outer electrodes 6 and 7, as required. For example, the plating film is composed of a Ni plating film and a Sn plating film formed on the Ni plating film.

In the multilayer ceramic capacitor 1 in FIG. 1, the first and second outer electrodes 6 and 7 are formed on opposite end faces of the multilayer body 5. The internal electrodes 3 and 4 include a plurality of first internal electrodes 3 electrically connected to the first outer electrode 6 and a plurality of second internal electrodes 4 electrically connected to the second outer electrode 7. These first and second internal electrodes 3 and 4 are alternately disposed in the stacking direction.

The multilayer ceramic capacitor 1 may be of a 2-terminal type including two outer electrodes 6 and 7 or of a multi-terminal type including multiple outer electrodes.

The dielectric ceramic layers 2 are formed of a multilayer body ceramic containing crystal grains and crystal grain boundaries. The crystal grains are mainly perovskite crystal grains composed mainly of a perovskite compound. Thus, the main component of the multilayer body 5 or the main component of the dielectric ceramic layers 2 is the perovskite compound.

Such a perovskite compound can be identified by an XRD method. In the present invention, the perovskite compound contains Ba and Ti or Ba, Ca, and Ti. In the latter perovskite compound containing Ca, although the Ca content is lower than the Ba and Ti contents, identification of Ca in a central portion of crystal grains, for example, by an analytical electron microscope STEM method shows that the main component is barium calcium titanate, that is, a perovskite compound containing Ba, Ca, and Ti.

Although the mole ratio of the A site to the B site in perovskite compounds is stoichiometrically 1.00, if necessary, the A site or the B site may be in excess without affecting various characteristics and sinterability.

In addition to the perovskite compound contained as a main component, the dielectric ceramic that forms the dielectric ceramic layers 2 contains Ca, R (R denotes at least one of La, Ce, Pr, Nd, Sm, Eu, Gd, Tb, Dy, Ho, and Y), M (M denotes at least one of Mn, Co, Fe, Cr, Cu, Mg, Al, V, Mo, and W), and Si as auxiliary components.

In the case that the main component is the perovskite compound containing Ba and Ti, the amounts of the components with respect to 100 molar parts of Ti are as follows:
0.5 to 2.5 molar parts of Ca,
0.5 to 4 molar parts of R,
0.5 to 2 molar parts of M, and
1 to 4 molar parts of Si.

In the case that the main component contains Ca, that is, the main component is the perovskite compound containing Ba, Ca, and Ti, the amounts of the components with respect to 100 molar parts of Ti are as follows:
2.5 to 15 molar parts of Ca,
0.5 to 4 molar parts of R,
0.5 to 2 molar parts of M, and
1 to 4 molar parts of Si.

In the case that the main component is the perovskite compound containing Ba, Ca, and Ti, the Ca content is increased as the total amount and is higher than the Ca content in the case that the main component is the perovskite compound free of Ca as described above.

The ratio of the element contents of the multilayer body 5 can be quantitatively analyzed by dissolving the multilayer body 5 and, for example, by inductively coupled plasma (ICP) spectrometry. It is basically preferable to only specify the composition of an electrostatic-capacity-generating portion of the dielectric ceramic layers 2. When the dielectric ceramic layers 2 occupy most of the multilayer body 5, however, the ratio of the element contents of the dielectric ceramic that forms the dielectric ceramic layers 2 is considered to be the same as the ratio of the element contents of the multilayer body 5. Thus, it is sufficient to only specify the composition of the multilayer body 5.

The auxiliary components Ca, R, M, and Si may have any form.

The auxiliary component Ca may be in the form of an oxide at crystal grain boundaries and triple junctions or may form secondary phase particles as a composite oxide containing a plurality of elements. Characteristically, the auxiliary component Ca is a perovskite component in the surface layer portion (shell) of crystal grains.

The auxiliary components R and M may be in the form of an oxide at crystal grain boundaries and triple junctions, may form secondary phase particles as a composite oxide containing a plurality of elements, or may form a perovskite compound in the surface layer portion (shell) of crystal grains. In particular, it is desirable that the auxiliary component R form a perovskite compound in the surface layer portion (shell) of crystal grains.

The form of these auxiliary components will be more specifically described below with reference to FIG. 2.

Figure 2:
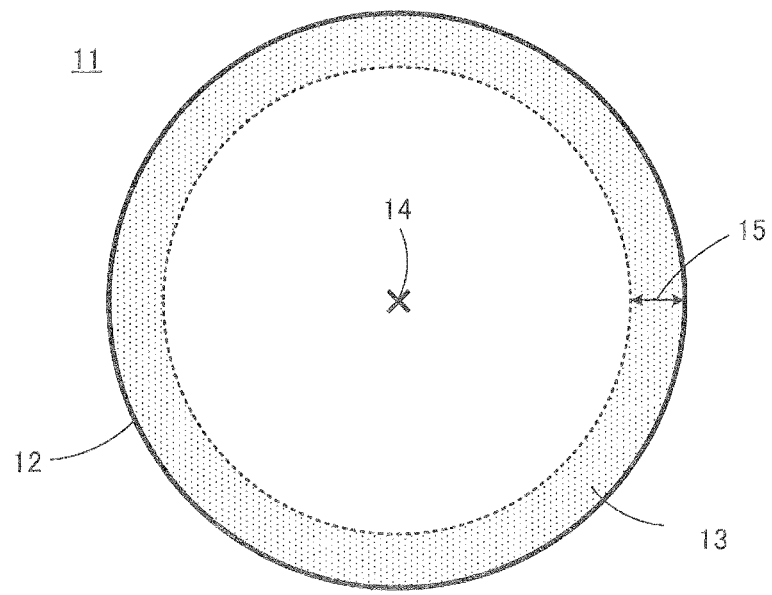
FIG. 2 illustrates a characteristic constituent of the present invention and is a roughly schematic enlarged cross-sectional view of a perovskite crystal grain 11.

FIG. 2 is a roughly schematic enlarged cross-sectional view of a perovskite crystal grain 11. FIG. 2 illustrates the perovskite crystal grain 11 and a crystal grain boundary 12. A surface layer portion 13 of the perovskite crystal grain 11 contains R and M as well as Ca. In the case that the perovskite crystal grain 11 is composed mainly of a perovskite compound containing Ba and Ti, preferably, only the surface layer portion 13 and the crystal grain boundary 12 contain Ca, R, and M. In the case that the perovskite crystal grain 11 is composed mainly of a perovskite compound containing Ba, Ca, and Ti, although Ca is distributed throughout the perovskite crystal grain 11, more Ca is distributed in the surface layer portion 13 and the crystal grain boundary 12, and R and M are preferably distributed only in the surface layer portion 13 and the crystal grain boundary 12.

In the present invention, the surface layer portion 13 is defined as described below.

First, the concentration of Ca in a perovskite crystal grain is represented by the relative concentration of Ca with respect to 100 molar parts of Ti at a point of measurement. In the case that the Ca concentration is represented as described above, a region having a Ca concentration 0.1 molar parts or more higher than the Ca concentration measured near the center 14 of the crystal grain 11 is defined as the surface layer portion 13.

In the present invention, the distance 15 of the surface layer portion 13 from the crystal grain boundary 12 toward the center 14 of the crystal grain 11 is defined as a "Ca diffusion depth". The "Ca diffusion depth" is 10% or less of the average grain size of crystal grains. The difference between the average concentration of Ca in the region defining the "Ca diffusion depth", that is, the surface layer portion 13 and the Ca concentration measured near the center 14 of the crystal grain 11 is defined as an "increased Ca concentration". The "increased Ca concentration" ranges from 0.2 to 5 molar parts.

When the form of Ca satisfies the conditions described above, the dielectric ceramic has a high relative dielectric constant, good insulating properties, a low electric field dependence of relative dielectric constant, and satisfactory lifetime characteristics. R in the region defining the "Ca diffusion depth" further improves the lifetime characteristics due to the synergistic effect of Ca and R. These effects are particularly significant when each of the dielectric ceramic layers 2 has a thickness of 0.8 µm or less on average.

A method for producing the multilayer ceramic capacitor 1 will be described below.

First, a main component powder composed mainly of a perovskite compound is prepared. Thus, when the perovskite compound contains Ba and Ti, for example, a Ba compound and a Ti compound are mixed to synthesize barium titanate. When the perovskite compound contains Ba, Ca, and Ti, for example, a Ba compound, a Ti compound, and a Ca compound are mixed to synthesize barium calcium titanate.

More specifically, a solid-phase synthesis method, that is, a method for mixing and heat-treating a $BaCO_3$ powder and a $TiO_2$ powder or a method for mixing and heat-treating a $BaCO_3$ powder, a $CaCO_3$ powder, and a $TiO_2$ powder can be employed. Alternatively, a method for synthesizing barium titanate in a solution by adding a solution containing Ba to $TiO_2$ fine particles, a method for synthesizing barium calcium titanate in a solution by adding a solution containing Ba and Ca to $TiO_2$ fine particles, or a wet synthesis method, such as a hydrothermal synthesis method, a hydrolysis method, or an oxalic acid method, can be employed. For the synthesis of barium calcium titanate, a reactive $BaTiO_3$ powder and a Ca compound may be mixed and subjected to sufficient heat treatment to produce a barium calcium titanate powder.

A Ca compound, an M compound, an R compound, and a Si compound are prepared as auxiliary components. These compounds may have any form, such as an oxide powder, a carboxide powder, sol, or an organic metal.

The main component powder is then mixed with the auxiliary components, the Ca compound, M compound, R compound, and Si compound. The auxiliary components may contain Zr resulting from a raw material production process. The auxiliary components may have any mixture form. For example, a plurality of auxiliary components may be mixed in advance or may be synthesized by heat treatment. A particular auxiliary component may be added in two steps or more. Part of the auxiliary components may be mixed in advance in the synthesis of the main component without compromising the objects of the present invention.

In any case, the ratio of the element contents of a dielectric ceramic raw powder containing the main component powder and the auxiliary component compounds is substantially the same as the ratio of the element contents of a dielectric ceramic that forms the dielectric ceramic layers 2.

A ceramic slurry containing the main component powder and the auxiliary component compounds is prepared. In the preparation of the ceramic slurry, a binder may be mixed with the ceramic slurry containing the main component powder and the auxiliary components before a sheet forming process. Alternatively, the main component powder may be mixed with the auxiliary components and may be dried to produce a ceramic raw material. The ceramic raw material may be mixed with a solvent again to produce a ceramic slurry. If necessary, the ceramic raw material powder may be subjected to heat treatment to allow the main component powder to react with the auxiliary components.

The ceramic slurry is then formed into a ceramic green sheet.

A conductive paste may be applied to the ceramic green sheet to form a conductive paste film, which is to form the internal electrodes 3 and 4.

A plurality of ceramic green sheets including the ceramic green sheet on which the conductive paste film, which is to form the internal electrodes 3 and 4, has been formed are stacked and press-bonded to form a green multilayer body before firing.

After the binder is removed, the green multilayer body is fired at an oxygen partial pressure at which the internal electrodes 3 and 4 are not oxidized and the dielectric ceramic is not reduced. The firing sinters the conductive paste film, which is to form the internal electrodes 3 and 4, and yields a sintered multilayer body 5 including the dielectric ceramic layers 2 formed of the dielectric ceramic containing crystal grains and crystal grain boundaries. The perovskite crystal grains 11 in the dielectric ceramic have the "Ca diffusion depth" and "increased Ca concentration" as described above with reference to FIG. 2.

The "Ca diffusion depth" and "increased Ca concentration" may be controlled by any method. For example, as described later in the experimental examples, the "Ca diffusion depth" and "increased Ca concentration" can be controlled by adjusting the firing temperature and heating rate in the firing step. The "Ca diffusion depth" and "increased Ca concentration" can also be controlled by adjusting the degree of crystallinity of the main component perovskite crystal grains, the form of the auxiliary component compounds, the mixing and pulverization conditions in the production of the ceramic slurry, and/or the firing and holding time.

The outer electrodes 6 and 7 are then formed on the end faces of the multilayer body 5 on which the internal electrodes 3 and 4 are exposed, thus completing the multilayer ceramic capacitor 1. The outer electrodes 6 and 7 may be formed by applying a conductive paste to the surface of the multilayer body in advance before firing and by baking the conductive paste during firing to produce the multilayer body 5.

Experimental examples performed on the basis of the present invention will be described below.

[Experimental Example 1]

In Experimental Example 1, a perovskite compound contained in the dielectric ceramic as a main component was $BaTiO_3$.

(A) Preparation of Ceramic Raw Material

First, a high-purity $BaCO_3$ powder and a $TiO_2$ powder were prepared as starting materials for producing the main component $BaTiO_3$. These powders were uniformly dispersed by wet blending in a ball mill and were dried to produce a mixed powder. The mixed powder was then calcined at a temperature of 1100° C. to produce a main component powder having an average particle size of 0.14 μm.

Powders of $CaCO_3$, $R_2O_3$, $MgCO_3$, $MnO$, $V_2O_5$, $MoO_3$, $Cr_2O_3$, $CuO$, $Al_2O_3$, and $SiO_2$ were prepared as auxiliary components. The $R_2O_3$ powders were $Dy_2O_3$, $Y_2O_3$, $La_2O_3$, $Tb_2O_3$, $Gd_2O_3$, and $Ho_2O_3$ powders.

These $CaCO_3$, $R_2O_3$, $MgCO_3$, $MnO$, $V_2O_5$, $MoO_3$, $Cr_2O_3$, $CuO$, $Al_2O_3$, and $SiO_2$ powders were then weighed as auxiliary component powders. The molar parts of Ca, R, Mg, Mn, V, Mo, Cr, Cu, Al, and Si with respect to 100 molar parts of Ti are listed in Table 1. As listed in the column "Type of R" in Table 1, the samples 25 and 28 contained two elements as R. In these samples, the total amount of the two elements mixed in equal proportions is listed in the column "Amount of R".

The auxiliary component powders were added to the main component powder. The mixed powder was uniformly dispersed by wet blending in a ball mill and was dried to produce a ceramic raw material.

TABLE 1

| Sample No. | Amount of Ca (molar parts) | Type of R | Amount of R (molar parts) | Amount of Mg (molar parts) | Amount of Mn (molar parts) | Amount of V (molar parts) | Amount of Mo (molar parts) | Amount of Cr (molar parts) | Amount of Cu (molar parts) | Amount of Al (molar parts) | Amount of Si (molar parts) | Firing temperature (° C.) | Heating rate during firing (° C./s) |
|---|---|---|---|---|---|---|---|---|---|---|---|---|---|
| 1* | 1.5 | Dy | 1.1 | 1.0 | 0.2 | 0.1 | 0.0 | 0.0 | 0.0 | 0.0 | 2.5 | 1180 | 0.1 |
| 2* | 1.5 | Dy | 1.1 | 1.5 | 0.2 | 0.1 | 0.0 | 0.0 | 0.0 | 0.0 | 1.5 | 1180 | 0.1 |
| 3* | 0.6 | Dy | 1.1 | 0.5 | 0.2 | 0.2 | 0.0 | 0.0 | 0.0 | 0.0 | 1.5 | 1180 | 0.1 |
| 4* | 2.7 | Dy | 1.1 | 0.5 | 0.2 | 0.2 | 0.0 | 0.0 | 0.0 | 0.0 | 1.5 | 1240 | 50 |
| 5* | 0.1 | Dy | 1.1 | 0.5 | 0.2 | 0.2 | 0.0 | 0.0 | 0.0 | 0.0 | 1.5 | 1240 | 50 |
| 6* | 1.0 | Dy | 0.4 | 0.2 | 0.2 | 0.2 | 0.0 | 0.0 | 0.0 | 0.0 | 1.2 | 1240 | 50 |
| 7* | 1.0 | Dy | 4.2 | 1.0 | 0.4 | 0.2 | 0.0 | 0.0 | 0.0 | 0.0 | 2.5 | 1240 | 50 |
| 8* | 1.0 | Dy | 1.1 | 0.2 | 0.1 | 0.1 | 0.0 | 0.0 | 0.0 | 0.0 | 1.0 | 1240 | 50 |
| 9* | 1.0 | Dy | 1.1 | 1.6 | 0.4 | 0.1 | 0.0 | 0.0 | 0.0 | 0.0 | 2.0 | 1240 | 50 |
| 10* | 1.5 | Dy | 1.1 | 0.5 | 0.2 | 0.2 | 0.0 | 0.0 | 0.0 | 0.0 | 0.8 | 1240 | 50 |
| 11* | 1.5 | Dy | 1.1 | 0.5 | 0.2 | 0.2 | 0.0 | 0.0 | 0.0 | 0.0 | 4.1 | 1250 | 100 |
| 12 | 2.5 | Dy | 3.7 | 0.5 | 0.4 | 0.2 | 0.0 | 0.0 | 0.0 | 0.0 | 3.0 | 1250 | 100 |
| 13 | 1.0 | Dy | 2.4 | 0.5 | 0.2 | 0.1 | 0.0 | 0.0 | 0.0 | 0.0 | 2.2 | 1240 | 50 |

TABLE 1-continued

| Sample No. | Amount of Ca (molar parts) | Type of R | Amount of R (molar parts) | Amount of Mg (molar parts) | Amount of Mn (molar parts) | Amount of V (molar parts) | Amount of Mo (molar parts) | Amount of Cr (molar parts) | Amount of Cu (molar parts) | Amount of Al (molar parts) | Amount of Si (molar parts) | Firing temperature (° C.) | Heating rate during firing (° C./s) |
|---|---|---|---|---|---|---|---|---|---|---|---|---|---|
| 14 | 1.5 | Dy | 1.1 | 0.4 | 0.1 | 0.0 | 0.0 | 0.0 | 0.0 | 0.0 | 2.0 | 1240 | 50 |
| 15 | 0.7 | Dy | 1.1 | 0.8 | 0.1 | 0.1 | 0.0 | 0.0 | 0.0 | 0.0 | 1.0 | 1240 | 50 |
| 16 | 2.4 | Dy | 2.8 | 0.5 | 0.2 | 0.2 | 0.0 | 0.0 | 0.0 | 0.0 | 2.5 | 1240 | 50 |
| 17 | 1.5 | Dy | 0.5 | 0.4 | 0.1 | 0.1 | 0.0 | 0.0 | 0.0 | 0.0 | 1.5 | 1240 | 50 |
| 18 | 1.0 | Dy | 1.5 | 0.4 | 0.2 | 0.0 | 0.0 | 0.0 | 0.0 | 0.0 | 2.0 | 1240 | 50 |
| 19 | 0.5 | Dy | 1.1 | 0.6 | 0.2 | 0.2 | 0.0 | 0.0 | 0.0 | 0.0 | 1.2 | 1250 | 100 |
| 20 | 1.0 | Y | 2.2 | 0.8 | 0.4 | 0.2 | 0.0 | 0.0 | 0.0 | 0.0 | 2.5 | 1240 | 50 |
| 21 | 1.5 | Dy | 1.0 | 0.1 | 0.2 | 0.0 | 0.2 | 0.0 | 0.0 | 0.1 | 1.5 | 1250 | 100 |
| 22 | 1.5 | Dy | 1.0 | 0.8 | 0.2 | 0.0 | 0.0 | 0.0 | 0.1 | 0.0 | 1.5 | 1240 | 50 |
| 23 | 1.5 | Dy | 1.0 | 0.8 | 0.1 | 0.0 | 0.0 | 0.2 | 0.0 | 0.0 | 1.5 | 1240 | 50 |
| 24 | 1.0 | La | 0.8 | 0.4 | 0.2 | 0.2 | 0.0 | 0.0 | 0.0 | 0.0 | 1.5 | 1240 | 50 |
| 25 | 1.0 | Y + Tb | 2.6 | 0.8 | 0.2 | 0.2 | 0.0 | 0.0 | 0.0 | 0.0 | 3.2 | 1240 | 50 |
| 26 | 1.0 | Gd | 4.0 | 1.4 | 0.4 | 0.2 | 0.0 | 0.0 | 0.0 | 0.0 | 4.0 | 1240 | 50 |
| 27 | 1.0 | Ho | 1.1 | 0.5 | 0.2 | 0.2 | 0.0 | 0.0 | 0.0 | 0.0 | 2.0 | 1240 | 50 |
| 28 | 1.0 | Dy + Ho | 1.5 | 0.4 | 0.4 | 0.2 | 0.0 | 0.0 | 0.0 | 0.0 | 1.5 | 1240 | 50 |

(B) Production of Multilayer Ceramic Capacitor

A poly(vinyl butyral) binder, a plasticizer, and an organic solvent ethanol were then added to the ceramic raw material. The mixture was wet-blended in a ball mill to produce a ceramic slurry. The ICP analysis showed that the ceramic slurry had the compound composition listed in Table 1.

The ceramic slurry was then formed in a lip system into a rectangular ceramic green sheet having a thickness of 1.3 μm.

A conductive paste containing Ni was then applied to the ceramic green sheet by screen printing, thereby forming a conductive paste film, which was to form internal electrodes.

A plurality of ceramic green sheets including the ceramic green sheet on which the conductive paste film had been formed were stacked such that lading edges of the conductive paste films extended in alternate directions, thus forming a green multilayer body.

The green multilayer body was then heated at a temperature of 350° C. for 3 hours in a $N_2$ atmosphere to burn the binder and was then heated at a temperature of 700° C. for 2 hours in a $N_2$ atmosphere to burn the binder again. A firing step was then performed in a reducing atmosphere composed of a $H_2$—$N_2$—$H_2O$ gas having an oxygen partial pressure $10^{-10}$ MPa at the "Firing temperature" and at the "Heating rate during firing" listed in Table 1.

In the firing step, when the heating rate listed in the column "Heating rate during firing" in Table 1 is 0.1° C./s, the green multilayer body was held at the temperature listed in the "Firing temperature" in Table 1 for 2 hours before cooling. When the heating rate was 50° C./s or 100° C./s, the multilayer body was cooled with no holding time.

The XRD structural analysis of the multilayer body under typical XRD analysis conditions showed that the main component had a barium titanate perovskite structure.

After the multilayer body was polished, portions near each central portion of the multilayer body in the length, width, and thickness directions were sliced. Twenty crystal grains were observed by STEM. The crystal grain boundaries in each cross section were subjected to mapping analysis. The interior of each crystal grain, including a surface layer portion (shell) and a central portion of the crystal grain, was subjected to mapping analysis to examine the state of Ca. As a result, no Ca was detected near the center of each crystal grain even in the point analysis by STEM. This proves that the main component of the crystal grains was barium titanate. The STEM mapping analysis was performed under the same conditions as in the measurement of the "Ca diffusion depth" described later.

A Cu paste containing a glass frit was applied to both end faces of the multilayer body and was baked in a $N_2$ atmosphere at a temperature of 800° C. to form outer electrodes electrically connected to the internal electrodes, thus completing a multilayer ceramic capacitor of each sample.

The external dimensions of the multilayer ceramic capacitor thus produced were 1.0 mm in length, 0.5 mm in width, and 0.5 mm in thickness. Each of the dielectric ceramic layers between the internal electrodes had a thickness of 0.8 μm on average. The number of effective dielectric ceramic layers was 250. The counter electrode area per dielectric ceramic layer was 0.27 mm². Each of the internal electrodes had a thickness of 0.5 μm on average.

The thickness of the dielectric ceramic layers and the thickness of the internal electrodes were measured as described below.

First, while the multilayer ceramic capacitor of each sample was stood on end, the multilayer ceramic capacitor was surrounded with a resin. Three samples were used for each sample number.

The multilayer ceramic capacitor surrounded with the resin was polished with a grinder so as to expose an LT cross section defined by the dimensions in the length and thickness directions of the multilayer ceramic capacitor. The polishing depth was half the dimension of the multilayer body of the multilayer ceramic capacitor in the width direction. The polished surface was then subjected to ion milling to remove dullness due to polishing. An LT cross section for observation was prepared in this manner.

Figure 3:
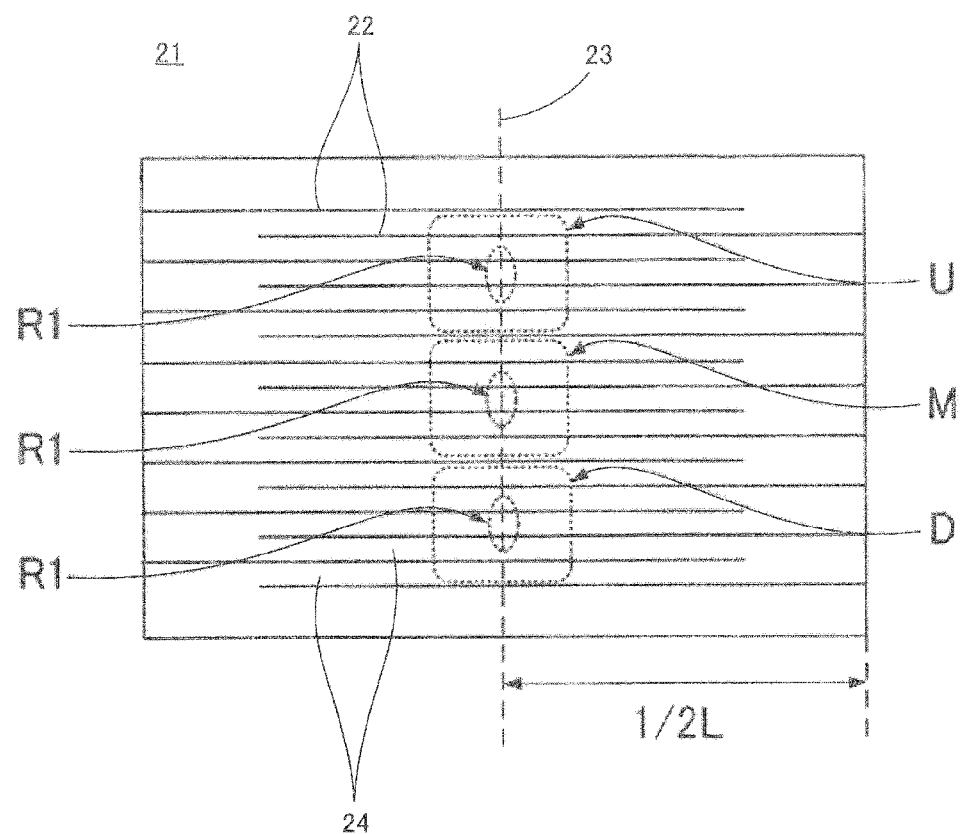
FIG. 3 is a schematic view of an LT cross section 21 of a multilayer body for the purpose of illustration of a method for measuring the thickness of dielectric ceramic layers 24 of a multilayer ceramic capacitor obtained in an experimental example.

As illustrated in FIG. 3, a perpendicular line 23 perpendicular to internal electrodes 22 was then drawn at half the longitudinal dimension (½ L) of an LT cross section 21. The region of the stacked internal electrodes 22 in the multilayer ceramic capacitor of the sample was divided in the thickness direction (T direction) into three equal regions: an upper portion U, an intermediate portion M, and a lower portion D. Ten dielectric ceramic layers 24 from a central portion in the thickness direction (T direction) in each region were selected. The thickness of the dielectric ceramic layers 24 on the perpendicular line 23 was measured with a scanning electron microscope. In FIG. 3, a region including the ten dielectric ceramic layers in each of the upper portion U, the intermediate portion M, and the lower portion D is illustrated as a measurement region R1. Unmeasurable cases were eliminated, such as the case where the dielectric ceramic layers 24 adjacent to one of the internal electrodes 22 come into contact with each other due to a loss in the internal electrode 22 on the perpendicular line 23.

For each sample number, the thicknesses of the dielectric ceramic layers 24 were measured at 90 points (=3 pieces×3 regions×10 layers) and were averaged.

In the same manner, the thicknesses of the internal electrodes 22 were measured at 90 points except the portions where the internal electrodes 22 were partly lost, and were averaged.

After the outer electrodes were removed from the multilayer ceramic capacitor, the fired multilayer body was dissolved and was analyzed by ICP. Except for the internal electrode component Ni, the fired multilayer body had the same composition as the compound composition listed in Table 1.

(C) Evaluation

The multilayer ceramic capacitor of each sample was evaluated as described below.

(1) Crystal Grain Size

The crystal grain size of dielectric ceramic that forms dielectric ceramic layers of a multilayer ceramic capacitor was determined by the following method.

A multilayer ceramic capacitor was broken near the center thereof in the width direction and was subjected to thermal etching at 1000° C. Randomly selected 300 or more crystal grains near the center of the fracture surface were then observed by FE-SEM. The equivalent circular diameter was calculated, and D50 was considered to be the average grain size of the crystal grains. The value is listed in the column "Crystal grain size" in Table 2.

(2) Diffusion of Ca

A portion near each central portion of the multilayer ceramic capacitor in the length, width, and thickness directions was sliced from the broken sample. Twenty crystal grains were analyzed by STEM. Crystal grains to be analyzed were randomly selected near each central portion of the multilayer ceramic capacitor in the length, width, and thickness directions. The crystal grains had a grain size (equivalent circular diameter) corresponding to 80% or more of the D50. Crystal grains having a relatively small grain size in a STEM slice sample were likely to have a cross section that was not close to the center of each of the crystal grains on the slice sample. Such crystal grains were inappropriate for the evaluation of element diffusion from the crystal grain surface and were excluded. Crystal grains to be analyzed were selected from crystal grains that had clear crystal interfaces between the crystal grains and adjacent crystal grains and had crystal grain boundaries extending nearly perpendicularly to the surface of a slice sample.

In the STEM analysis, the STEM was "JEM-2200FS" manufactured by JEOL Ltd. The accelerating voltage was 200 kV. The detector EDS was "JED-2300T" manufactured by JEOL Ltd. and was an SDD detector having a 60-mm² aperture. The EDS system was "Noran System 7" manufactured by Thermo Fisher Scientific Inc. The slice samples had a thickness of approximately 100 nm.

Under such conditions, the "Ca diffusion depth" was determined as described below.

First, crystal grains were subjected to Ca element mapping analysis by STEM. The mapping time was 1 hour. Portions in each grain in which Ca had an average diffusion depth were selected as candidates for measurement portions.

A point analysis was performed from a crystal grain boundary toward a central portion of each crystal grain. In the point analysis, a point at which the Si concentration was 50% or less of the Si concentration (relative concentration of Si to Ti at a point of measurement) measured at the crystal grain boundary was determined. A portion in which the distance from the crystal grain boundary to the point was 5 nm or less, that is, a portion in which the influence of the grain boundary could be eliminated in the STEM analysis (the crystal grain boundary was nearly perpendicular to the surface of a slice sample) was selected, and the Ca diffusion depth in the crystal grain was analyzed in the portion. In the point analysis, measurements were performed at 10 or more points in the grain boundary and from the grain boundary toward a central portion of the crystal grain at intervals of at least 2 nm. The point analysis was performed in a range that could limit the diffusion region. The same point analysis was performed on the auxiliary component elements other than Ca in the same crystal grain at the same points.

The Ca concentration at one point near a central portion of the crystal grain was also measured by the point analysis and was considered to be the Ca concentration in a Ca non-diffusion region. The term "Ca concentration" as used hereinafter refers to the relative concentration of Ca with respect to 100 molar parts of Ti at a point of measurement.

One measurement of the concentration in the STEM point analysis took 30 seconds. The concentration of each element was determined by a simple quantitative method.

The "Ca diffusion depth" is defined as the distance from the crystal grain boundary to a point that has a Ca concentration 0.1 molar parts or more higher than the Ca concentration measured near the center of the crystal grain.

A Ca concentration curve obtained by the point analysis was averaged in the crystal grain boundary and a region defining the "Ca diffusion depth" to determine the "averaged Ca concentration". The difference between the "averaged Ca concentration" and the "Ca concentration near a central portion of the crystal grain" was defined as the "increased Ca concentration".

Table 2 lists the average value of the "Ca diffusion depth" and the average value of the "Increased Ca concentration".

(3) Diffusion of R

Also in an R diffusion region, in the same portion where the Ca diffusion region was determined, the R diffusion depth was up to the point where R was detected at a concentration 0.1 molar parts or more higher than the R concentration measured near the center of each crystal grain. The results are listed in the column "Diffusion of R in Ca diffusion region" in Table 2. In this column, "circle" indicates that R diffuses to at least the depth to which Ca diffuses, that is, the average value of the "Ca diffusion depth" the average value of the "R diffusion depth", and "triangle" indicates that R diffuses more shallowly than Ca, that is, the average value of the "Ca diffusion depth">the average value of the "R diffusion depth". The analysis was performed by the analysis method for determining the Ca diffusion region.

"Diffusion of R in Ca diffusion region" was evaluated in the samples 12 to 28.

(4) Relative Dielectric Constant

The electrostatic capacity of a multilayer ceramic capacitor was measured with an automated bridge type measuring instrument at 25° C., at 1.0 Vrms, and at 1 kHz. The electrostatic capacities of 30 samples were measured, and the relative dielectric constant was determined from the average measured value.

The results are listed in the column "Relative dielectric constant" in Table 2.

(5) Electrostatic Capacity-Temperature Characteristics

Under the same conditions as in the measurement of the "Relative dielectric constant" except the temperature conditions, the electrostatic capacities of 30 multilayer ceramic capacitors were measured at a temperature in the range of −55° C. to +125° C. The maximum rate of change in electrostatic capacity ($\Delta C_{TC}$) between the electrostatic capacity ($C_{TC}$) and the electrostatic capacity at 25° C. ($C_{25}$) was calculated using $\Delta C_{TC}=\{(C_{TC}-C_{25})/C_{25}\}\times 100\,[\%]$. The results are listed in the column "Electrostatic capacity-temperature characteristics" in Table 2.

(6) Capacitance Change Due to Application of DC

The electrostatic capacity $C_{0V}$ of a multilayer ceramic capacitor in the absence of the direct current bias and the electrostatic capacity $C_{2V}$ of the multilayer ceramic capacitor in the presence of a direct current bias of 2 V were measured with an automated bridge type measuring instrument at a temperature of 25° C. The rate of change in capacitance=$\{(C_{2V}-C_{0V})/C_{0V}\}\times 100\,[\%]$ was determined as the average in 30 samples. The results are listed in the column "Capacitance change due to application of DC" in Table 2.

(7) Specific Resistance

A direct-current voltage of 10 V was applied to a multilayer ceramic capacitor at 25° C. for 120 seconds, and the insulation resistance was measured with an insulation resistance tester. The specific resistance log (ρ/Ω·m) was calculated from the average insulation resistance of 30 samples. The results are listed in the column "Specific resistance" in Table 2.

(8) Lifetime Characteristics

A direct-current voltage of 15 V was applied to 36 multilayer ceramic capacitors at 150° C. The insulation resistance was observed over time. When the insulation resistance of each multilayer ceramic capacitor reached 0.1 MΩ or less, the multilayer ceramic capacitor was considered to have broken down. The mean time to failure was analyzed using Weibull plots, and the average mean time to failure (MTTF) was determined. The results are listed in the column "MTTF" in Table 2.

TABLE 2

| | | Ca diffusion region | | | | | | | |
|---|---|---|---|---|---|---|---|---|---|
| Sample No. | Crystal grain size (nm) | Ca diffusion depth (nm) | Increased Ca concentration (molar parts) | R diffusion Diffusion of R in Ca diffusion region | Relative Dielectric Constant | Electrostatic capacity-temperature characteristics (%) | Capacitance change due to application of DC (%) | Specific resistance (log(ρ/ Ω·m) | MTTF (h) |
| 1* | 162 | 30 | 1.3 | — | 3020 | −16.4 | −8.6 | 10.2 | 126 |
| 2* | 163 | 21 | 1.7 | — | 3060 | −16.6 | −8.8 | 10.3 | 118 |
| 3* | 177 | 25 | 0.4 | — | 3450 | −17.6 | −10.5 | 9.8 | 76 |
| 4* | 172 | 20 | 5.1 | — | 2860 | −13.7 | −8.5 | 9.7 | 46 |
| 5* | 147 | 11 | 0.1 | — | 3210 | −14.4 | −10.2 | 10.2 | 31 |
| 6* | 155 | 15 | 1.5 | — | 3260 | −13.7 | −11.4 | 9.7 | 37 |
| 7* | 145 | 14 | 1.4 | — | 2840 | −16.3 | −9.3 | 10.3 | 116 |
| 8* | 156 | 14 | 1.5 | — | 3130 | −14.8 | −11.1 | 9.7 | 75 |
| 9* | 142 | 12 | 1.5 | — | 3080 | −14.4 | −9.7 | 9.6 | 47 |
| 10* | 144 | 8 | 3.3 | — | 3050 | −14.4 | −9.7 | 9.9 | 66 |
| 11* | 162 | 16 | 1.6 | — | 3310 | −16.4 | −11.3 | 9.8 | 88 |
| 12 | 155 | 15 | 2.9 | ○ | 3160 | −14.9 | −9.9 | 10.3 | 132 |
| 13 | 151 | 12 | 1.6 | ○ | 3130 | −14.5 | −9.7 | 10.4 | 127 |
| 14 | 145 | 11 | 2.6 | ○ | 3050 | −14.3 | −9.4 | 10.4 | 131 |
| 15 | 153 | 10 | 0.9 | ○ | 3190 | −14.6 | −9.6 | 10.3 | 122 |
| 16 | 177 | 15 | 5.0 | ○ | 3260 | −14.7 | −9.8 | 10.5 | 131 |
| 17 | 164 | 14 | 2.3 | ○ | 3210 | −14.6 | −9.9 | 10.4 | 112 |
| 18 | 155 | 12 | 1.6 | ○ | 3090 | −14.7 | −9.8 | 10.3 | 133 |
| 19 | 154 | 11 | 0.2 | ○ | 3060 | −14.4 | −9.7 | 10.2 | 111 |
| 20 | 148 | 12 | 1.6 | ○ | 3020 | −14.4 | −9.7 | 10.1 | 122 |
| 21 | 152 | 12 | 2.3 | ○ | 3050 | −14.7 | −9.5 | 10.1 | 116 |
| 22 | 144 | 13 | 2.4 | ○ | 3060 | −14.4 | −9.5 | 10.2 | 120 |
| 23 | 142 | 12 | 2.3 | ○ | 3050 | −14.3 | −9.4 | 10.2 | 118 |
| 24 | 151 | 10 | 1.9 | ○ | 3130 | −14.9 | −9.8 | 10.2 | 112 |
| 25 | 144 | 12 | 1.5 | ○ | 3020 | −14.8 | −9.4 | 10.1 | 129 |
| 26 | 142 | 13 | 1.4 | ○ | 3010 | −14.9 | −9.5 | 10.3 | 133 |
| 27 | 141 | 11 | 1.6 | Δ | 3040 | −14.7 | −9.7 | 10.1 | 102 |
| 28 | 156 | 14 | 1.4 | Δ | 3130 | −14.7 | −9.4 | 10.2 | 104 |

In Tables 1 and 2, sample numbers marked with an asterisk indicate comparative examples outside the scope of the present invention.

The criteria with respect to each evaluation item listed in Table 2 were as follows:

"Relative dielectric constant": 3000 or more was judged to be acceptable.

"Electrostatic capacity-temperature characteristics": ±15.0% or less was judged to be acceptable.

"Capacitance change due to application of DC": ±10% or less was judged to be acceptable.

"Specific resistance": 10 or more was judged to be acceptable.

"MTTF": 100 hours or more was judged to be acceptable.

The samples 12 to 28 within the scope of the present invention satisfied the following conditions: as listed in Table 2, the "Ca diffusion depth" was 10% or less of the "Crystal grain size", and the "increased Ca concentration" ranged from 0.2 to 5 molar parts, and, as listed in Table 1, the "Amount of Ca" ranged from 0.5 to 2.5 molar parts, the "Amount of R" ranged from 0.5 to 4 molar parts, the M content, which was the total of the "Amount of Mg", "Amount of Mn", "Amount of V", "Amount of Mo", "Amount of Cr", "Amount of Cu", and "Amount of Al", ranged from 0.5 to 2 molar parts, and the "Amount of Si" ranged from 1 to 4 molar parts.

As listed in Table 2, the samples 12 to 28 satisfied the acceptance criteria with respect to the "Relative dielectric constant", "Electrostatic capacity-temperature characteristics", "Capacitance change due to application of DC", "Specific resistance", and "MTTF".

As shown in the column "Diffusion of R in Ca diffusion region" in Table 2, in the samples 12 to 28, the R concentration was also measured by STEM point analysis in the region where the Ca concentration was measured by STEM analysis. Although the samples 27 and 28 in which the R diffusion depth was smaller than the Ca diffusion depth, as indicated by "triangle", had "MTTF" approximately 10% lower than the samples 12 to 26, this does not cause any significant problem from a practical standpoint.

In contrast, in the samples 1 to 11 outside the scope of the present invention, as listed in Table 2, at least one of "Relative dielectric constant", "Electrostatic capacity-temperature characteristics", "Capacitance change due to application of DC", "Specific resistance", and "MTTF" did not satisfy the acceptance criteria.

In the samples 1 to 3, at least the absolute value of "Inductive capacitance-temperature characteristics" was more than 15.0%. This is probably because the "Ca diffusion depth" was more than 10% of the "Crystal grain size".

In the sample 4, at least the "Specific resistance" was less than 10, and the "MTTF" was much less than 100 hours. This is probably because the "Increased Ca concentration" was more than 5 molar parts.

In the sample 5, at least "MTTF" was much less than 100 hours. This is probably because the "Increased Ca concentration" was less than 0.2 molar parts.

In the samples 6 to 11, at least one of the "Relative dielectric constant" and "MTTF" was unacceptable. This is probably because at least one of the "Amount of Ca", "Amount of R", "Amount of Mg", "Amount of Mn", "Amount of V", "Amount of Mo", "Amount of Cr", "Amount of Cu", "Amount of Al", and "Amount of Si" listed in Table 1 was outside the scope of the present invention, even if the "Ca diffusion depth" and "Increased Ca concentration" were within the scope of the present invention.

[Experimental Example 2]

In Experimental Example 2, a perovskite compound contained in the dielectric ceramic as a main component was $(Ba_{1-x}Ca_x)TiO_3$.

(A) Preparation of Ceramic Raw Material

First, a high-purity $BaCO_3$ powder, a $CaCO_3$ powder, and a $TiO_2$ powder were prepared as starting materials for producing the main component $(Ba_{1-x}Ca_x)TiO_3$ and were compounded. The "x" of $(Ba_{1-x}Ca_x)TiO_3$ was listed in Table 3.

The compound powder was then uniformly dispersed by wet blending in a ball mill and was dried to produce an adjusted powder. The adjusted powder was then calcined at a temperature in the range of 1000° C. to 1200° C. (the optimum temperature was determined for each sample). The resulting main component powder had an average particle size of 0.13 μm.

Powders of $CaCO_3$, $R_2O_3$, $MgCO_3$, $MnO$, $V_2O_5$, $WO_3$, $Co_2O_3$, $CuO$, $Al_2O_3$, and $SiO_2$ were prepared as auxiliary components. The $R_2O_3$ powders were $Dy_2O_3$, $Y_2O_3$, $La_2O_3$, $Sm_2O_3$, $Gd_2O_3$, and $Ho_2O_3$ powders.

These $CaCO_3$, $R_2O_3$, $MgCO_3$, $MnO$, $V_2O_5$, $WO_3$, $Co_2O_3$, $CuO$, $Al_2O_3$, and $SiO_2$ powders were then weighed as auxiliary component powders. The molar parts of Ca, R, Mg, Mn, V, W, Co, Cu, Al, and Si with respect to 100 molar parts of Ti are listed in Table 3.

In Table 3, there are "Amount of Ca" and "Total amount of Ca" with respect to Ca. The "Amount of Ca" refers to only the amount of Ca added as an auxiliary component. The "Total amount of Ca" refers to the total of the "Amount of Ca" and the amount of Ca in the main component $(Ba_{1-x}Ca_x)TiO_3$.

As listed in the column "Type of R" in Table 3, the samples 54, 55, and 58 contained two elements as R. In these samples, the total amount of the two elements mixed in equal proportions is listed in the column "Amount of R".

The auxiliary component powders were added to the main component powder. The mixed powder was uniformly dispersed by wet blending in a ball mill and was dried to produce a ceramic raw material.

TABLE 3

| Sample No. | Amount of X | Amount of Ca (molar parts) | Total amount of Ca (molar parts) | Type of R | Amount of R (molar parts) | Amount of Mg (molar parts) | Amount of Mn (molar parts) | Amount of V (molar parts) |
|---|---|---|---|---|---|---|---|---|
| 29* | 0.02 | 1.5 | 3.5 | Dy | 1.2 | 1.0 | 0.2 | 0.1 |
| 30* | 0.08 | 2.0 | 10.0 | Dy | 1.2 | 1.5 | 0.2 | 0.1 |
| 31* | 0.025 | 0.1 | 2.6 | Dy | 1.2 | 0.5 | 0.2 | 0.2 |
| 32* | 0.02 | 4.0 | 6.0 | Dy | 1.2 | 0.5 | 0.2 | 0.2 |
| 33* | 0.02 | 0.2 | 2.2 | Dy | 1.2 | 0.5 | 0.2 | 0.2 |
| 34* | 0.14 | 1.5 | 15.5 | Dy | 3.8 | 1.0 | 0.4 | 0.2 |
| 35* | 0.02 | 1.5 | 3.5 | Dy | 0.4 | 0.2 | 0.2 | 0.2 |
| 36* | 0.02 | 1.5 | 3.5 | Dy | 4.1 | 1.0 | 0.4 | 0.2 |
| 37* | 0.02 | 1.5 | 3.5 | Dy | 1.2 | 0.2 | 0.1 | 0.1 |
| 38* | 0.02 | 1.5 | 3.5 | Dy | 1.2 | 1.6 | 0.4 | 0.1 |
| 39* | 0.08 | 2.0 | 10.0 | Dy | 1.2 | 0.5 | 0.2 | 0.2 |
| 40* | 0.08 | 2.0 | 10.0 | Dy | 1.2 | 0.5 | 0.2 | 0.2 |
| 41 | 0.04 | 0.2 | 4.2 | Dy | 1.2 | 0.4 | 0.2 | 0.2 |
| 42 | 0.02 | 2.5 | 4.5 | Dy | 4.0 | 0.5 | 0.4 | 0.2 |
| 43 | 0.02 | 1.5 | 3.5 | Dy | 2.5 | 0.5 | 0.2 | 0.1 |
| 44 | 0.02 | 1.5 | 3.5 | Dy | 0.5 | 0.4 | 0.2 | 0.2 |
| 45 | 0.02 | 1.5 | 3.5 | Dy | 1.2 | 0.8 | 0.0 | 0.1 |
| 46 | 0.02 | 2.5 | 4.5 | Dy | 3.0 | 0.5 | 0.2 | 0.2 |
| 47 | 0.02 | 1.5 | 3.5 | Dy | 2.1 | 0.4 | 0.1 | 0.0 |

TABLE 3-continued

| | | | | | | | |
|---|---|---|---|---|---|---|---|
| 48 | 0.02 | 1.5 | 3.5 | Dy | 1.6 | 0.4 | 0.2 | 0.2 |
| 49 | 0.02 | 0.5 | 2.5 | Dy | 1.2 | 0.6 | 0.2 | 0.2 |
| 50 | 0.08 | 2.0 | 10.0 | Y | 2.4 | 1.5 | 0.3 | 0.2 |
| 51 | 0.04 | 1.0 | 5.0 | Dy | 1.0 | 0.1 | 0.2 | 0.0 |
| 52 | 0.04 | 1.0 | 5.0 | Dy | 1.0 | 0.8 | 0.2 | 0.0 |
| 53 | 0.04 | 1.0 | 5.0 | Dy | 1.0 | 0.8 | 0.0 | 0.1 |
| 54 | 0.04 | 1.0 | 5.0 | La + Y | 2.0 | 0.8 | 0.3 | 0.0 |
| 55 | 0.04 | 1.0 | 5.0 | Sm + Y | 1.6 | 0.8 | 0.3 | 0.0 |
| 56 | 0.04 | 1.0 | 5.0 | Gd | 1.6 | 0.8 | 0.3 | 0.0 |
| 57 | 0.04 | 1.0 | 5.0 | Ho | 1.0 | 0.8 | 0.3 | 0.0 |
| 58 | 0.13 | 2.0 | 15.0 | Y + Dy | 1.8 | 0.4 | 0.2 | 0.2 |

| Sample No. | Amount of W (molar parts) | Amount of Co (molar parts) | Amount of Cu (molar parts) | Amount of Al (molar parts) | Amount of Si (molar parts) | Firing temperature (° C.) | Heating rate during firing (° C./s) |
|---|---|---|---|---|---|---|---|
| 29* | 0.0 | 0.0 | 0.0 | 0.0 | 2.5 | 1170 | 0.1 |
| 30* | 0.0 | 0.0 | 0.0 | 0.0 | 1.5 | 1170 | 0.1 |
| 31* | 0.0 | 0.0 | 0.0 | 0.0 | 1.5 | 1170 | 0.1 |
| 32* | 0.0 | 0.0 | 0.0 | 0.0 | 1.5 | 1240 | 50 |
| 33* | 0.0 | 0.0 | 0.0 | 0.0 | 1.0 | 1240 | 50 |
| 34* | 0.0 | 0.0 | 0.0 | 0.0 | 3.0 | 1240 | 50 |
| 35* | 0.0 | 0.0 | 0.0 | 0.0 | 1.2 | 1240 | 50 |
| 36* | 0.0 | 0.0 | 0.0 | 0.0 | 2.5 | 1240 | 50 |
| 37* | 0.0 | 0.0 | 0.0 | 0.0 | 1.0 | 1240 | 50 |
| 38* | 0.0 | 0.0 | 0.0 | 0.0 | 2.0 | 1240 | 50 |
| 39* | 0.0 | 0.0 | 0.0 | 0.0 | 0.8 | 1240 | 50 |
| 40* | 0.0 | 0.0 | 0.0 | 0.0 | 4.1 | 1260 | 100 |
| 41 | 0.0 | 0.0 | 0.0 | 0.0 | 2.1 | 1240 | 50 |
| 42 | 0.0 | 0.0 | 0.0 | 0.0 | 4.0 | 1240 | 50 |
| 43 | 0.0 | 0.0 | 0.0 | 0.0 | 2.4 | 1240 | 50 |
| 44 | 0.0 | 0.0 | 0.0 | 0.0 | 2.1 | 1240 | 50 |
| 45 | 0.0 | 0.0 | 0.0 | 0.0 | 1.0 | 1250 | 100 |
| 46 | 0.0 | 0.0 | 0.0 | 0.0 | 3.0 | 1240 | 50 |
| 47 | 0.0 | 0.0 | 0.0 | 0.0 | 1.8 | 1240 | 50 |
| 48 | 0.0 | 0.0 | 0.0 | 0.0 | 2.2 | 1240 | 50 |
| 49 | 0.0 | 0.0 | 0.0 | 0.0 | 1.2 | 1240 | 50 |
| 50 | 0.0 | 0.0 | 0.0 | 0.0 | 2.7 | 1240 | 50 |
| 51 | 0.1 | 0.0 | 0.0 | 0.2 | 1.2 | 1250 | 100 |
| 52 | 0.0 | 0.1 | 0.0 | 0.0 | 1.8 | 1240 | 50 |
| 53 | 0.0 | 0.0 | 0.2 | 0.1 | 1.8 | 1240 | 50 |
| 54 | 0.0 | 0.0 | 0.0 | 0.0 | 2.0 | 1240 | 50 |
| 55 | 0.0 | 0.0 | 0.0 | 0.0 | 2.0 | 1240 | 50 |
| 56 | 0.0 | 0.0 | 0.0 | 0.0 | 2.5 | 1240 | 50 |
| 57 | 0.0 | 0.0 | 0.0 | 0.0 | 1.8 | 1240 | 50 |
| 58 | 0.0 | 0.0 | 0.0 | 0.0 | 1.8 | 1240 | 50 |

(B) Production of Multilayer Ceramic Capacitor

A ceramic slurry and a multilayer body were produced from the ceramic raw material through the same production process as in Experimental Example 1. The ICP analysis showed that the ceramic slurry had the compound composition listed in Table 3.

The XRD structural analysis of the multilayer body showed that the main component had a barium titanate perovskite structure.

The multilayer body was polished. A portion near each central portion of the multilayer body in the length, width, and thickness directions was sliced. Twenty crystal grains were analyzed by STEM. The STEM analysis method was the same as in Experimental Example 1. Ca was clearly detected near the center of each of the main component crystal grains, showing that the main component of the crystal grains was barium calcium titanate.

Outer electrodes were formed on both end faces of the multilayer body through the same production process as in Experimental Example 1, thus completing a multilayer ceramic capacitor of each sample.

The external dimensions of the multilayer ceramic capacitor thus produced were 1.0 mm in length, 0.5 mm in width, and 0.5 mm in thickness. Each of the dielectric ceramic layers between the internal electrodes had a thickness of 0.8 µm on average. The number of effective dielectric ceramic layers was 250. The counter electrode area per dielectric ceramic layer was 0.27 mm². Each of the internal electrodes had a thickness of 0.5 µm on average.

The thickness of the dielectric ceramic layers and the thickness of the internal electrodes were measured in the same manner as in Experimental Example 1.

After the outer electrodes were removed from the multilayer ceramic capacitor, the fired multilayer body was dissolved and was analyzed by ICP. Except for the internal electrode component Ni, the fired multilayer body had the same composition as the compound composition listed in Table 3.

(C) Evaluation

The "Crystal grain size", "Ca diffusion depth", "Increased Ca concentration", "Relative dielectric constant", "Capacitance change due to application of DC", "Specific resistance", and "MTTF" were evaluated in the multilayer ceramic capacitor of each sample in the same manner as in Experimental Example 1. Table 4 shows the results.

Although not shown in Table 4, the R diffusion depth was also evaluated only in the samples 41 to 58.

TABLE 4

| Sample No. | Crystal grain size (nm) | Ca diffusion region | | | Relative Dielectric Constant | Electrostatic capacity-temperature characteristics | Capacitance change due to application of DC (%) | Specific resistance (log(ρ/ Ω·m) | MTTF (h) |
|---|---|---|---|---|---|---|---|---|---|
| | | Ca diffusion depth (nm) | Increased Ca concentration (molar parts) | | | | | | |
| 29* | 151 | 25 | 1.5 | | 3050 | −16.2 | −11.5 | 10.3 | 103 |
| 30* | 147 | 21 | 2.2 | | 2770 | −16.8 | −9.2 | 10.1 | 96 |
| 31* | 146 | 16 | 0.1 | | 3220 | −15.8 | −10.7 | 10.3 | 44 |
| 32* | 142 | 18 | 5.1 | | 2670 | −16.6 | −10.3 | 10.4 | 104 |
| 33* | 155 | 6 | 0.1 | | 3240 | −14.7 | −10.2 | 9.8 | 46 |
| 34* | 145 | 5 | 4.0 | | 2360 | −13.2 | −8.7 | 10.2 | 115 |
| 35* | 140 | 9 | 2.9 | | 3360 | −14.7 | −11.5 | 10.1 | 63 |
| 36* | 141 | 13 | 2.2 | | 2940 | −16.5 | −9.7 | 10.1 | 112 |
| 37* | 142 | 12 | 2.3 | | 3090 | −15.3 | −10.8 | 9.8 | 87 |
| 38* | 145 | 14 | 2.1 | | 2870 | −14.7 | −10.5 | 9.8 | 65 |
| 39* | 140 | 10 | 3.3 | | 2960 | −14.6 | −10.1 | 10.1 | 62 |
| 40* | 155 | 14 | 2.4 | | 3450 | −16.3 | −10.9 | 10.2 | 88 |
| 41 | 145 | 13 | 0.2 | | 3210 | −14.5 | −9.8 | 10.3 | 148 |
| 42 | 142 | 14 | 3.1 | | 3000 | −14.9 | −9.8 | 10.4 | 166 |
| 43 | 138 | 12 | 2.8 | | 3220 | −14.9 | −9.9 | 10.3 | 155 |
| 44 | 142 | 13 | 2.2 | | 3240 | −14.8 | −9.9 | 10.3 | 143 |
| 45 | 145 | 10 | 2.8 | | 3310 | −15.0 | −10 | 10.2 | 137 |
| 46 | 139 | 10 | 5.0 | | 3020 | −14.9 | −9.9 | 10.4 | 174 |
| 47 | 140 | 12 | 2.3 | | 3160 | −14.6 | −9.8 | 10.3 | 166 |
| 48 | 142 | 12 | 2.3 | | 3210 | −14.8 | −9.9 | 10.3 | 158 |
| 49 | 144 | 14 | 0.6 | | 3250 | −14.9 | −10 | 10.4 | 146 |
| 50 | 141 | 10 | 3.4 | | 3020 | −14.6 | −9.8 | 10.3 | 188 |
| 51 | 145 | 12 | 1.3 | | 3260 | −14.8 | −9.9 | 10.2 | 165 |
| 52 | 144 | 12 | 1.2 | | 3250 | −14.7 | −9.9 | 10.3 | 161 |
| 53 | 146 | 13 | 1.1 | | 3270 | −14.6 | −9.8 | 10.2 | 155 |
| 54 | 136 | 11 | 1.3 | | 3170 | −14.6 | −9.7 | 10.1 | 153 |
| 55 | 139 | 13 | 1.2 | | 3180 | −14.7 | −9.7 | 10.2 | 156 |
| 56 | 141 | 13 | 1.2 | | 3200 | −14.8 | −9.9 | 10.2 | 173 |
| 57 | 139 | 12 | 1.3 | | 3150 | −14.5 | −9.8 | 10.2 | 145 |
| 58 | 138 | 8 | 3.8 | | 3010 | −14.6 | −9.6 | 10.2 | 179 |

In Tables 3 and 4, sample numbers marked with an asterisk indicate comparative examples outside the scope of the present invention.

The criteria with respect to each evaluation item listed in Table 4 were the same as in Experimental Example 1.

The samples 41 to 58 within the scope of the present invention satisfied the following conditions: as listed in Table 4, the "Ca diffusion depth" was 10% or less of the "Crystal grain size", and the "Increased Ca concentration" ranged from 0.2 to 5 molar parts, and, as listed in Table 3, the "Total amount of Ca" ranged from 2.5 to 15 molar parts, the "Amount of R" ranged from 0.5 to 4 molar parts, the M content, which was the total of the "Amount of Mg", "Amount of Mn", "Amount of V", "Amount of W", "Amount of Co", "Amount of Cu", and "Amount of Al", ranged from 0.5 to 2 molar parts, and the "Amount of Si" ranged from 1 to 4 molar parts.

As listed in Table 4, the samples 41 to 58 satisfied the acceptance criteria with respect to the "Relative dielectric constant", "Electrostatic capacity-temperature characteristics", "Capacitance change due to application of DC", "Specific resistance", and "MTTF".

Although not shown in Table 4, in the samples 41 to 58, the R concentration was also measured by STEM point analysis in the region where the Ca concentration was measured by STEM analysis. As a result, in all the samples 41 to 58, it was found that R was diffused in a diffusion region having a high Ca concentration.

In contrast, in the samples 29 to 40 outside the scope of the present invention, as listed in Table 4, at least one of "Relative dielectric constant", "Electrostatic capacity-temperature characteristics", "Capacitance change due to application of DC", "Specific resistance", and "MTTF" did not satisfy the acceptance criteria.

In the samples 29 and 30, at least the absolute value of "Inductive capacitance-temperature characteristics" was more than 15.0%. This is probably because the "Ca diffusion depth" was more than 10% of the "Crystal grain size".

In the sample 31, at least "MTTF" was much less than 100 hours. This is probably because the "Increased Ca concentration" was less than 0.2 molar parts.

In the sample 32, at least the "Relative dielectric constant" was less than 3000, and the absolute value of the "Electrostatic capacity-temperature characteristics" was more than 15.0%. This is probably because the "Increased Ca concentration" was more than 5 molar parts.

In the samples 33 to 40, at least one of the "Relative dielectric constant", "Electrostatic capacity-temperature characteristics", "Capacitance change due to application of DC", "Specific resistance", and "MTTF" was unacceptable. This is probably because at least one of the "Total amount of Ca", "Amount of R", "Amount of Mg", "Amount of Mn", "Amount of V", "Amount of W", "Amount of Co", "Amount of Cu", "Amount of Al", and "Amount of Si" listed in Table 3 was outside the scope of the present invention, even if the "Ca diffusion depth" and "Increased Ca concentration" were within the scope of the present invention.

REFERENCE SIGNS LIST

1 Multilayer ceramic capacitor
2 Dielectric ceramic layer
3, 4 Internal electrode 5 Multilayer body
6, 7 Outer electrode
11 Perovskite crystal grain
12 Crystal grain boundary
13 Surface layer portion
14 center
15 Ca diffusion depth

The invention claimed is:

1. A multilayer ceramic capacitor comprising:
a multilayer body including a plurality of stacked dielectric ceramic layers and a plurality of internal electrodes disposed along a plurality of interfaces between the dielectric ceramic layers, the dielectric ceramic layers comprising a dielectric ceramic containing crystal grains and crystal grain boundaries; and
an outer electrode disposed on a surface of the multilayer body and electrically connected to specific internal electrodes thereamong,
wherein the multilayer body contains
a perovskite compound containing Ba and Ti, and Ca, R, M, and Si,
wherein R is at least one of La, Ce, Pr, Nd, Sm, Eu, Gd, Tb, Dy, Ho, and Y, and
M is at least one of Mn, Co, Fe, Cr, Cu, Mg, Al, V, Mo, and W,
the multilayer body contains, with respect to 100 molar parts of Ti,
0.5 molar parts to 2.5 molar parts of Ca,
0.5 molar parts to 4 molar parts of R,
0.5 molar parts to 2 molar parts of M, and
1 molar parts to 4 molar parts of Si,
the crystal grains include perovskite crystal grains composed mainly of the perovskite compound,
wherein, when a Ca concentration in the perovskite crystal grains is represented by a relative Ca concentration with respect to 100 molar parts of Ti at a point of measurement,
the crystal grains have a Ca diffusion depth region within 10% of an average grain size of the crystal grains and that extends from the crystal grain boundary toward the center of the crystal grain, and
a difference between an average of the Ca concentration in the entirety of the Ca diffusion depth region and the Ca concentration at the center of the crystal grain ranges from 0.2 molar parts to 5 molar parts.

2. The multilayer ceramic capacitor according to claim 1, wherein R is diffused in the Ca diffusion depth region.

3. The multilayer ceramic capacitor according to claim 1, wherein each of the dielectric ceramic layers has a thickness of 0.8 μm or less on average.

4. A multilayer ceramic capacitor comprising:
a multilayer body including a plurality of stacked dielectric ceramic layers and a plurality of internal electrodes disposed along a plurality of interfaces between the dielectric ceramic layers, the dielectric ceramic layers being formed of a dielectric ceramic containing crystal grains and crystal grain boundaries; and
an outer electrode disposed on a surface of the multilayer body and electrically connected to specific internal electrodes thereamong,
wherein the multilayer body contains
a perovskite compound containing Ba and Ti, and Ca, R, M, and Si,
wherein R is at least one of La, Ce, Pr, Nd, Sm, Eu, Gd, Tb, Dy, Ho, and Y, and
M is at least one of Mn, Co, Fe, Cr, Cu, Mg, Al, V, Mo, and W,
a solution of the multilayer body contains, with respect to 100 molar parts of Ti,
0.5 molar parts to 2.5 molar parts of Ca,
0.5 molar parts to 4 molar parts of R,
0.5 molar parts to 2 molar parts of M, and
1 molar parts to 4 molar parts of Si,
the crystal grains include perovskite crystal grains composed mainly of the perovskite compound, and
wherein, when a Ca concentration in the perovskite crystal grains is represented by a relative Ca concentration with respect to 100 molar parts of Ti at a point of measurement,
the crystal grains have a Ca diffusion depth region within 10% of an average grain size of the crystal grains and that extends from the crystal grain boundary toward the center of the crystal grain, and
a difference between an average of the Ca concentration in the entirety of the Ca diffusion depth region and the Ca concentration at the center of the crystal grain ranges from 0.2 molar parts to 5 molar parts.

5. The multilayer ceramic capacitor according to claim 4, wherein R is diffused in the Ca diffusion depth region.

6. The multilayer ceramic capacitor according to claim 4, wherein each of the dielectric ceramic layers has a thickness of 0.8 μm or less on average.

7. A multilayer ceramic capacitor comprising:
a multilayer body including a plurality of stacked dielectric ceramic layers and a plurality of internal electrodes disposed along a plurality of interfaces between the dielectric ceramic layers, the dielectric ceramic layers being formed of a dielectric ceramic containing crystal grains and crystal grain boundaries; and
an outer electrode disposed on a surface of the multilayer body and electrically connected to specific internal electrodes thereamong,
wherein the dielectric ceramic layers contain
a perovskite compound containing Ba and Ti, and Ca, R, M, and Si,
wherein R is at least one of La, Ce, Pr, Nd, Sm, Eu, Gd, Tb, Dy, Ho, and Y, and
M is at least one of Mn, Co, Fe, Cr, Cu, Mg, Al, V, Mo, and W,
the dielectric ceramic layers contain, with respect to 100 molar parts of Ti,
0.5 molar parts to 2.5 molar parts of Ca,
0.5 molar parts to 4 molar parts of R,
0.5 molar parts to 2 molar parts of M, and
1 molar parts to 4 molar parts of Si,
the crystal grains include perovskite crystal grains composed mainly of the perovskite compound, and
when a Ca concentration in the perovskite crystal grains is represented by a relative Ca concentration with respect to 100 molar parts of Ti at a point of measurement,
the crystal grains have a Ca diffusion depth region within 10% of an average grain size of the crystal grains and that extends from the crystal grain boundary toward the center of the crystal grain, and
a difference between an average of the Ca concentration in the entirety of the Ca diffusion depth region and the Ca concentration at the center of the crystal grain ranges from 0.2 molar parts to 5 molar parts.

8. The multilayer ceramic capacitor according to claim 7, wherein R is diffused in the Ca diffusion depth region.

9. The multilayer ceramic capacitor according to claim 7, wherein each of the dielectric ceramic layers has a thickness of 0.8 μm or less on average.

10. A multilayer ceramic capacitor comprising:
a multilayer body including a plurality of stacked dielectric ceramic layers and a plurality of internal electrodes disposed along a plurality of interfaces between the dielectric ceramic layers, the dielectric ceramic layers being formed of a dielectric ceramic containing crystal grains and crystal grain boundaries; and
an outer electrode disposed on a surface of the multilayer body and electrically connected to specific internal electrodes thereamong,
wherein the multilayer body contains
a perovskite compound containing Ba, Ca, and Ti, and Ca, R, M, and Si,
wherein R is at least one of La, Ce, Pr, Nd, Sm, Eu, Gd, Tb, Dy, Ho, and Y, and
M is at least one of Mn, Co, Fe, Cr, Cu, Mg, Al, V, Mo, and W,
the multilayer body contains, with respect to 100 molar parts of Ti,
2.5 molar parts to 15 molar parts of Ca,
0.5 molar parts to 4 molar parts of R,
0.5 molar parts to 2 molar parts of M, and
1 molar parts to 4 molar parts of Si,
the crystal grains include perovskite crystal grains composed mainly of the perovskite compound, and
wherein, when a Ca concentration in the perovskite crystal grains is represented by a relative Ca concentration with respect to 100 molar parts of Ti at a point of measurement,
the crystal grains have a Ca diffusion depth region within 10% of an average grain size of the crystal grains and that extends from the crystal grain boundary toward the center of the crystal grain, and
a difference between an average of the Ca concentration in the entirety of the Ca diffusion depth region and the Ca concentration at the center of the crystal grain ranges from 0.2molar parts to 5 molar parts.

11. The multilayer ceramic capacitor according to claim 10, wherein R is diffused in the Ca diffusion depth region.

12. The multilayer ceramic capacitor according to claim 10, wherein each of the dielectric ceramic layers has a thickness of 0.8 µm or less on average.

13. A multilayer ceramic capacitor comprising:
a multilayer body including a plurality of stacked dielectric ceramic layers and a plurality of internal electrodes disposed along a plurality of interfaces between the dielectric ceramic layers, the dielectric ceramic layers being formed of a dielectric ceramic containing crystal grains and crystal grain boundaries; and
an outer electrode disposed on a surface of the multilayer body and electrically connected to specific internal electrodes thereamong,
wherein the multilayer body contains
a perovskite compound containing Ba, Ca, and Ti, and Ca, R, M, and Si,
wherein R is at least one of La, Ce, Pr, Nd, Sm, Eu, Gd, Tb, Dy, Ho, and Y, and
M is at least one of Mn, Co, Fe, Cr, Cu, Mg, Al, V, Mo, and W,
a solution of the multilayer body contains, with respect to 100 molar parts of Ti,
2.5 molar parts to 15 molar parts of Ca,
0.5 molar parts to 4 molar parts of R,
0.5 molar parts to 2 molar parts of M, and
1 molar parts to 4 molar parts of Si,
the crystal grains include perovskite crystal grains composed mainly of the perovskite compound, and
wherein, when a Ca concentration in the perovskite crystal grains is represented by a relative Ca concentration with respect to 100 molar parts of Ti at a point of measurement,
the crystal grains have a Ca diffusion depth region within 10% of an average grain size of the crystal grains and that extends from the crystal grain boundary toward the center of the crystal grain, and
a difference between an average of the Ca concentration in the entirety of the Ca diffusion depth region and the Ca concentration at the center of the crystal grain ranges from 0.2 molar parts to 5 molar parts.

14. The multilayer ceramic capacitor according to claim 13, wherein R is diffused in the Ca diffusion depth region.

15. The multilayer ceramic capacitor according to claim 13, wherein each of the dielectric ceramic layers has a thickness of 0.8 µm or less on average.

16. A multilayer ceramic capacitor comprising:
a multilayer body including a plurality of stacked dielectric ceramic layers and a plurality of internal electrodes disposed along a plurality of interfaces between the dielectric ceramic layers, the dielectric ceramic layers being formed of a dielectric ceramic containing crystal grains and crystal grain boundaries; and
an outer electrode disposed on a surface of the multilayer body and electrically connected to specific internal electrodes thereamong,
wherein the dielectric ceramic layers contain
a perovskite compound containing Ba, Ca, and Ti, and Ca, R, M, and Si,
wherein R is at least one of La, Ce, Pr, Nd, Sm, Eu, Gd, Tb, Dy, Ho, and Y, and
M is at least one of Mn, Co, Fe, Cr, Cu, Mg, Al, V, Mo, and W,
the dielectric ceramic layers contain, with respect to 100 molar parts of Ti,
2.5 molar parts to 15 molar parts of Ca,
0.5 molar parts to 4 molar parts of R,
0.5 molar parts to 2 molar parts of M, and
1 molar parts to 4 molar parts of Si,
the crystal grains include perovskite crystal grains composed mainly of the perovskite compound, and
when a Ca concentration in the perovskite crystal grains is represented by a relative Ca concentration with respect to 100 molar parts of Ti at a point of measurement,
the crystal grains have a Ca diffusion depth region within 10% of an average grain size of the crystal grains and that extends from the crystal grain boundary toward the center of the crystal grain, and
a difference between an average of the Ca concentration in the entirety of the Ca diffusion depth region and the Ca concentration at the center of the crystal grain ranges from 0.2 molar parts to 5 molar parts.

17. The multilayer ceramic capacitor according to claim 16, wherein R is diffused in the Ca diffusion depth region.

18. The multilayer ceramic capacitor according to claim 16, wherein each of the dielectric ceramic layers has a thickness of 0.8 µm or less on average.

19. A method for producing a multilayer ceramic capacitor, the method comprising:
preparing a ceramic slurry containing a main component powder, a Ca compound, an R compound, an M compound, and a Si compound, the main component powder being composed mainly of a perovskite compound containing Ba and Ti, R is at least one of La, Ce, Pr, Nd, Sm, Eu, Gd, Tb, Dy, Ho, and Y, and M is at least one of Mn, Co, Fe, Cr, Cu, Mg, Al, V, Mo, and W;

forming a ceramic green sheet from the ceramic slurry;

forming an internal electrode on the ceramic green sheet;

stacking a plurality of the ceramic green sheets including the ceramic green sheet on which the internal electrode is formed to form a green multilayer body;

firing the green multilayer body to form a multilayer body including a plurality of dielectric ceramic layers and a plurality of internal electrodes disposed along a plurality of interfaces between the dielectric ceramic layers, the dielectric ceramic layers being formed of a dielectric ceramic containing crystal grains and crystal grain boundaries; and forming an outer electrode on a surface of the multilayer body such that the outer electrode is electrically connected to specific internal electrodes thereamong, wherein the ceramic slurry contains, with respect to 100 molar parts of Ti,
  0.5 molar parts to 2.5 molar parts of Ca,
  0.5 molar parts to 4 molar parts of R,
  0.5 molar parts to 2 molar parts of M, and
  1 molar parts to 4 molar parts of Si, the crystal grains include perovskite crystal grains composed mainly of the perovskite compound, and wherein, when a Ca concentration in the perovskite crystal grains is represented by a relative Ca concentration with respect to 100 molar parts of Ti at a point of measurement, the crystal grains have a Ca diffusion depth region within 10% of an average grain size of the crystal grains and that extends from the crystal grain boundary toward the center of the crystal grain, and a difference between an average of the Ca concentration in the entirety of the Ca diffusion depth region and the Ca concentration at the center of the crystal grain ranges from 0.2 molar parts to 5 molar parts.

20. A method for producing a multilayer ceramic capacitor, the method comprising:

preparing a ceramic slurry containing a main component powder, a Ca compound, an R compound, an M compound, and a Si compound, the main component powder being composed mainly of a perovskite compound containing Ba, Ca, and Ti, R is at least one of La, Ce, Pr, Nd, Sm, Eu, Gd, Tb, Dy, Ho, and Y, and M is at least one of Mn, Co, Fe, Cr, Cu, Mg, Al, V, Mo, and W;

forming a ceramic green sheet from the ceramic slurry;

forming an internal electrode on the ceramic green sheet;

stacking a plurality of the ceramic green sheets including the ceramic green sheet on which the internal electrode is formed to form a green multilayer body;

firing the green multilayer body to form a multilayer body including a plurality of dielectric ceramic layers and a plurality of internal electrodes disposed along a plurality of interfaces between the dielectric ceramic layers, the dielectric ceramic layers being formed of a dielectric ceramic containing crystal grains and crystal grain boundaries; and forming an outer electrode on a surface of the multilayer body such that the outer electrode is electrically connected to specific internal electrodes thereamong, wherein the ceramic slurry contains, with respect to 100 molar parts of Ti,
  2.5 molar parts to 15 molar parts of Ca,
  0.5 molar parts to 4 molar parts of R,
  0.5 molar parts to 2 molar parts of M, and
  1 molar parts to 4 molar parts of Si, the crystal grains include perovskite crystal grains composed mainly of the perovskite compound, and wherein, when a Ca concentration in the perovskite crystal grains is represented by a relative Ca concentration with respect to 100 molar parts of Ti at a point of measurement, the crystal grains have a Ca diffusion depth region within 10% of an average grain size of the crystal grains and that extends from the crystal grain boundary toward the center of the crystal grain, and a difference between an average of the Ca concentration in the entirety of the Ca diffusion depth region and the Ca concentration at the center of the crystal grain ranges from 0.2 molar parts to 5 molar parts.

* * * * *